March 28, 1967     O. OETLIKER     3,310,940
GAS TURBINES
Filed Oct. 7, 1965     2 Sheets-Sheet 1
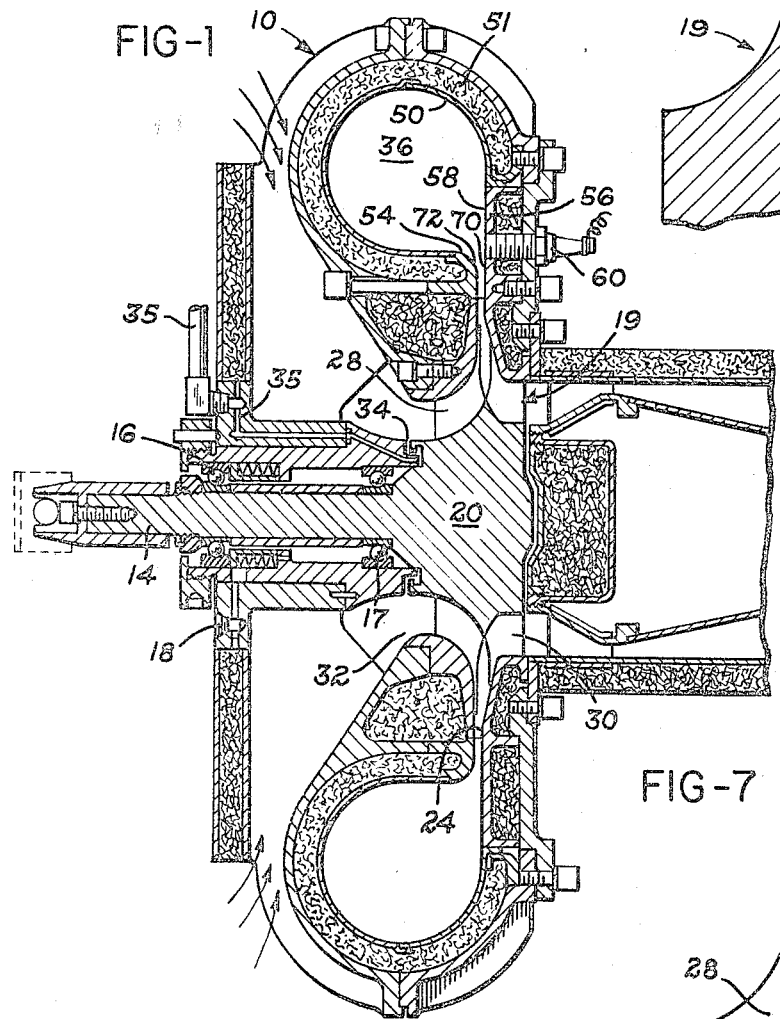
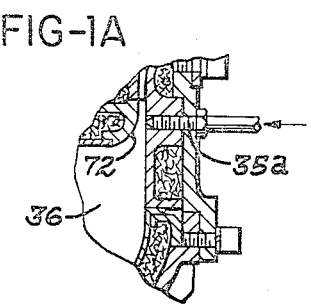
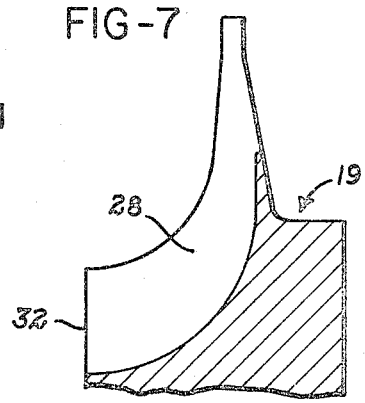
INVENTOR.
OTTO OETLIKER
BY
*Marechal, Biebel, French & Bugg*
ATTORNEYS

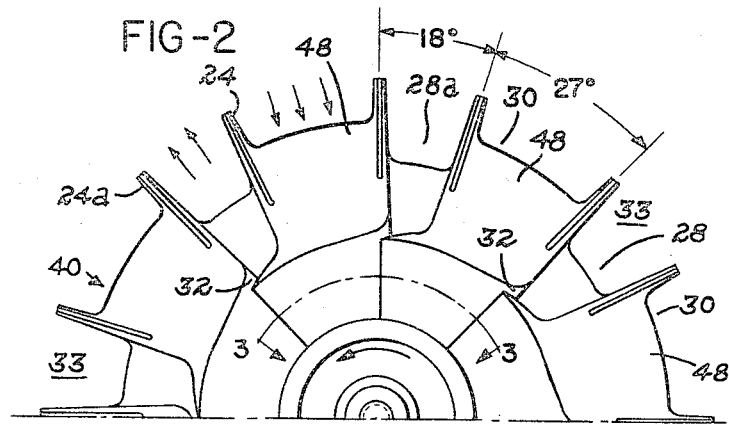
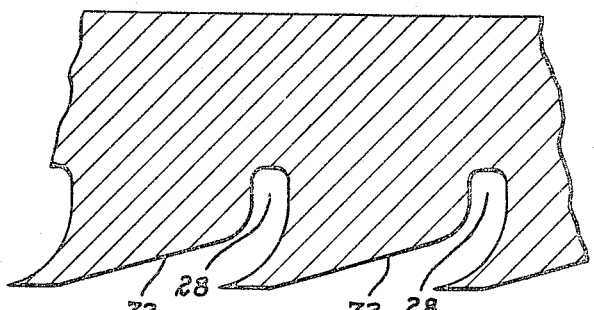
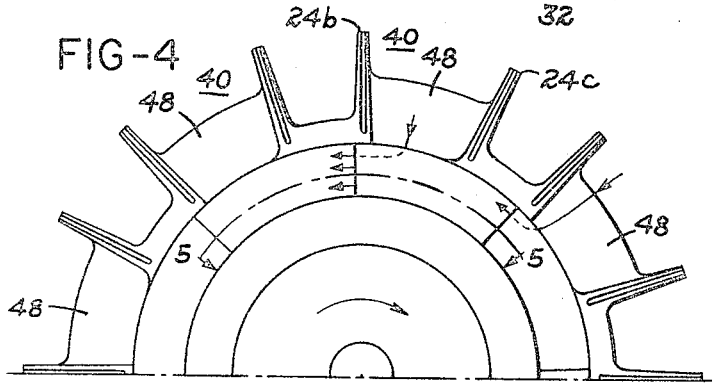
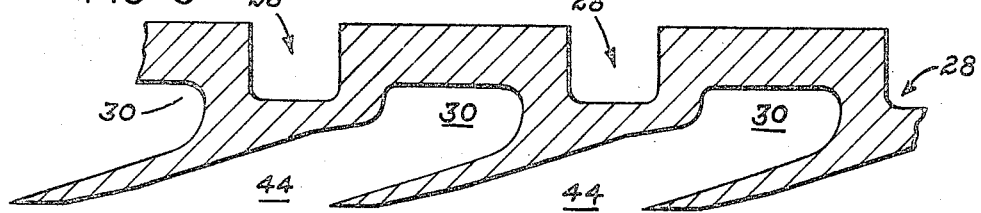

United States Patent Office 3,310,940
Patented Mar. 28, 1967

3,310,940
GAS TURBINES
Otto Oetliker, Essexville, Mich., assignor to The Stalker Corporation, Essexville, Mich., a corporation of Michigan
Filed Oct. 7, 1965, Ser. No. 493,855
10 Claims. (Cl. 60—39.36)

This invention relates to prime movers of the gas turbine type.

An object of this invention is to provide a combined compressed and turbine rotor so that the flow of gas or air through the compressor passages cools the turbine rotor and its blades.

Another object of this invention is to provide a rotor which has compressed air passages alternating peripherally with hot motive gas passages.

Still another object of this invention is to provide a combustion chamber and rotor wherein the rotor delivers peripherally spaced streams of an air-fuel mixture and receives high temperature motive gas between said streams into said rotor inward of the perimeter thereof and peripherally in line with each other.

A further object of this invention is to provide a gas turbine which can be produced cheaply.

These and other objects and advantages of the invention will become apparent from the following description, the accompanying drawings and the appended claims.

In the drawings—

FIG. 1 is an axial section through a gas turbine which is constructed according to this invention;

FIG. 1A is a fragmentary section consisting of a portion of FIG. 1 showing an alternate fuel arrangement;

FIG. 2 is an obverse view of a portion of the turbine rotor showing the compressor inlet side;

FIG. 3 is an enlarged developed fragmentary sectional view taken generally along line 3—3 of FIG. 2;

FIG. 4 is a reverse view of a portion of the rotor showing the turbine side thereof;

FIG. 5 is a further enlarged developed fragmentary sectional view taken generally along line 5—5 in FIG. 4; and FIGS. 6 and 7 are fragmentary enlarged vertical sections through the rotor showing the turbine and compressor flow passages, respectively.

Referring to the figures of the drawing which illustrate a preferred embodiment of this invention, the gas turbine comprises means forming a case 10 which supports a shaft 14 mounted in suitable axially spaced bearings 16 and 17 for high speed rotation about the shaft axis. Oil mist for bearing lubrication may enter through the opening 18. The shaft 14 carries a combination compressor turbine rotor 19 which has the hub 20 forming an axially narrow web extending radially relative to the axis. A plurality of radial blades 24 are fixed thereto and extend radially beyond the perimeter of the web and radially inwardly to the opposite sides thereof. The hub and blades define alternate compressor flow passages 28 (FIG. 7) and turbine flow passages 30 (FIG. 6). The compressor flow passages have the inlets 32 adjacent the rotor axis and the exits 33 at the blade tips at the perimeter of the rotor. The compressor and turbine passages at the rotor are peripherally in line with each other, that is; they have portions lying in the same radial reference plane.

The compressor passages discharge compressed air into a combustion or heating chamber means 36 formed in the case 10 annularly about the rotor where preferably fuel is burned for heating the gas therewithin. The resultant hot gas is the motive gas for driving or rotating the turbine. Fuel is preferably supplied to the peripheral slot 34 formed between the front of the rotor 19 and the case 10 via the passage means 35 in the case 10, upstream of the compressed passage exits.

In FIG. 1A there is shown an alternate arrangement by which the fuel may be injected into the combustion chamber 36. This includes a fuel injection nozzle 35a which is positioned to inject fuel into the chamber at a point radially outwardly of the tips of the blades.

The air issuing from the compressor blow passages 28 has a large peripheral or tangential component of velocity. When this air is heated as by fuel burning therein an increase in volume results in a high tangential velocity. The turbine passage flows enter the rotor turbine passages 30 at the blade tips and flow radially inward. In so doing they give up their peripheral component as energy to the rotor. This energy is large enough to supply the power for the compression of the air and to drive an external load or power absorber operably connected to the shaft 14.

As shown particularly in FIGS. 2 and 3, the compressor passages 28 are between the adjacent blades 24a and 24 defining the compressor passage inlets 32 and the exits 33. The turbine passages 30 have their inlets 40 between the adjacent blades 24b and 24c (for instance) and their exits 44 adjacent the rotor axis, that is radially inward from the inlets (see FIGS. 4 and 5 particularly). The hub 20 has web portions 48 between adjacent blades to define with the blades the compressor inlets on the obverse side of the rotor and the turbine exits on the reverse side thereof. Thus, on the obverse side air may enter only the compressor passages and the motive flow entering at the inlets at the rotor perimeter is discharged only from the turbine exits 44. The turbine flow will not enter the compressor passage exits because of the high centrifugal pressure thereat.

Each compressor passage radially laps the adjacent turbine passage along a major radial portion of the length of the blade bounding the turbine passage, preferably along the whole length of the blade as measured in the turbine passage, thereby providing effective cooling for each blade over a major portion of its radial length. In other words the radial length of the turbine passage side of each blade is such that on its opposite or compressor passage side of each blade, the blade is bathed by the compressor passage flow over a major portion of the radial length of this turbine passage side.

This rotor present substantial advantages in cooling and in cost of fabrication. The air flow in the compressor passage bathes each blade on one side to cool it and protect it from the heat from the hot motive gas flowing on the other side of the blade in the turbine passage. The cooling flow also bathes a substantial surface of the rotor hub and cools it. As a result the rotor, hubs and blades run relatively cool and it may be constructed of cheaper material, or with more expensive material, it may be rotated at much higher speeds so that more power may be generated for a given size of turbine. Thus, the cost per horsepower is lowered.

The heating or combustion chamber means 36 has the liner 50 of a heat resistant material, preferably a high temperature alloy backed by insulation 51. Also, the annular parts 54 and 56 are of high temperature material. These parts are arranged so that the flow from the compressor passages are discharged radially tangentially along a chamber wall surface 58 over a substantial radial extent so that the compressor flow is a thin layer or sheet along this wall surface. Thus, the combustible mixture issues from the rotor in a thin sheet about the axial width of the rotor passages at their exits. Combustion proceeds axially, that is, normal to surface 58, and has only a short distance to go to reach the opposite side of this layer of combustible mixture. Rapid combustion is facilitated by the hot wall portion on one side and the burning of gases on the opposite or inner side. This arrangement provides for very rapid combustion because the path of combustion is short of an extent of about the thickness of the layer of combustible mixture measured axially from surface 58. The heated gas circulates in a spiral inside the chamber and blows inward to the turbine inlets between the outward flows coming from the compressor passages.

This position of the layer of combustible mixture also facilitates its ignition by the glow plug 60 positioned radially outward of the rotor perimeter and adjacent to the inlet portion of the chamber.

It is desirable that a portion of at least one wall surface 58 of the combustion chamber be substantially in line or parallel to a radial reference plane perpendicular to the axis of rotation or at least not diverging from this plane by more than 30 degrees. This portion of the wall is followed by a larger portion 50 which is convex to the flow issuing from the compressor passages so that the fuel and air mixture clings to the wall and flows in streamlines along the wall while burning progresses. Accordingly, the combustion chamber 36 includes a wall surface 58 which extends along a substantial outward direction to receive the compressor flow from the compressor flow passages outward tangentially along this wall surface over a substantial outward extent, and further defines in an axial plane a concave surface at 50 to said radially outward flow so that the flow follows the wall and concave surfaces in a streamlined manner.

In this arrangement stators are not required adjacent the perimeter of the rotor. This makes for a low cost of the machine.

It is to be noted that the hot motive gas provides a plurality of streams thereof which enter the rotor at its perimeter alternated with the individual flows or streams of compressed air issuing radially outward from said rotor.

The portion of the chamber means adjacent the perimeter of the rotor provides a free or clear or undivided extent path from one side 70 of the chamber portion to the other side 72.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. In combination in a gas turbine, a rotor mounted for rotation about an axis, said rotor comprising a hub and a plurality of generally radial blades spaced peripherally about said hub, alternate adjacent pairs of said blades extending radially inward to opposite sides of said hub defining peripherally alternate compressor flow and turbine flow passages, combustion chamber means having a portion thereof disposed annularly about said rotor, said compressor upon rotation discharging air in radially outward flows into said chamber, means to burn fuel in said chamber providing a motive gas discharging therefrom into said turbine passages radially inward thereof in streams peripherally alternated with said radially outward flows from said compressor passages.

2. In combination in a gas turbine, a rotor mounted for rotation about an axis, said rotor comprising a hub and a plurality of generally radial blades spaced peripherally about said hub, alternate adjacent pairs of said blades extending radially inward to opposite sides of said hub defining peripherally alternate compressor flow and turbine flow passages, combustion chamber means having a portion thereof disposed annularly about said rotor, said compressor upon rotation discharging air in radially outward flows into said chamber, means to burn fuel in said chamber providing a motive gas discharging therefrom into said turbine passages radially inward thereof in streams peripherally alternated with said radially outward flows from said compressor passages, said flow from the compressor passages having substantial contact with the turbine passage flows at the portion of the said chamber adjacent the blade tips.

3. In combination in a gas turbine, a rotor mounted for rotation about an axis, said rotor comprising a hub and a plurality of generally radial blades spaced peripherally about said hub, alternate adjacent pairs of said blades extending radially inward to opposite sides of said hub defining peripherally alternate compressor flow and turbine flow passages, combustion chamber means having a portion thereof disposed annularly about said rotor and defining a portion of a wall along a substantial outward direction to receive the compressor flow from said compressor flow passages outward tangentially along said wall portion over a substantial outward extent and further having in a generally axial plane a concave surface to said radially outward flow so that the flow follows said wall and concave surfaces in a streamline manner, and means to burn fuel in said chamber providing a motive gas discharging therefrom into said turbine passages radially inward thereof in streams peripherally alternated with said radially outward flows from said compressor passages.

4. The combination of claim 3 in which said chamber wall portion lies within a generally axial plane which diverges not more than 30° from a radial reference plane normal to the axis of rotation of the rotor.

5. In combination in a gas turbine, a hub mounted for rotation about an axis, said hub having a web extending radially relative to said axis, a plurality of generally radially directed blades fixed to said web and extending radially beyond the perimeter of said web and radially inward and to opposite sides thereof, said blades being spaced peripherally about said hub defining alternate compressor and turbine passages having a blade in common dividing each said compressor passage from the adjacent said turbine passage, each said compressor passage having an inlet on an axial obverse side of said hub and each said turbine passage having an exit on the reverse side of said hub, each said compressor passage having an exit adjacent the peripheral tips of said blades, each said turbine passage having an inlet adjacent the peripheral tips of said blades interspaced therebetween, a chamber having a portion thereof peripherally about said blade tips for flows of gas into said rotor passages, said rotor upon rotation being adapted to induce a compressed flow of air through said compressor passage into said chamber with a peripheral component, means to heat said air to induce a motive gas flow from said chamber into said turbine passages for flow radially inward thereof to said turbine exits to power said rotor into rotation about said axis, and said gas flow being discharged from said exits of said turbine passages.

6. In combination in a gas turbine, a hub mounted for rotation about an axis, said hub having an axially narrow web extending radially relative to said axis, a plurality of radially directed blades fixed to said web and extending radially beyond the perimeter of said web and radially inward and to opposite sides thereof, said blades being spaced peripherally about said hub defining alternate compressor and turbine passages having a blade in common dividing each said compressor passage from the adjacent said turbine passage, each said compressor passage having an inlet on an axial obverse side of said hub and each said turbine passage having an exit on the reverse side of said hub, each said compressor passage having an exit adjacent the peripheral tips of said blades, each said turbine passage having an inlet adjacent the peripheral tips of said blades interspaced therebetween, a chamber having a portion thereof peripherally about said blade tips for flows of gas into said rotor passages, the axial width of said chamber portion at the turbine passage inlets being substantially the same as the axial width of said blade compressor passage exits, said rotor upon rotation being adapted to induce a compressed flow of air through said compressor passage into said chamber with a peripheral component, means to heat said air to induce a motive gas flow from said chamber into said turbine passages for flow radially inward thereof to said turbine exits to power said rotor into rotation about said axis, and said gas flow being discharged from said exits of said turbine passages.

7. The combination of claim 6 wherein said chamber portion provides a clear space along the flow paths of said compressor and turbine flows to provide contact between said flows along said paths.

8. In combination in a gas turbine, a hub mounted for rotation about an axis, said hub having an axially narrow web extending generally radially relative to said axis, a plurality of generally radially directed blades fixed to said web and extending beyond the perimeter of said web and radially inward and to opposite sides thereof, said blades being spaced peripherally about said hub defining alternate compressor and turbine passages having a blades in common dividing each said compressor passage from the adjacent said turbine passage, each said compressxor passage having an inlet on an axial obverse side of said hub and each said turbine passage having an exit of the reverse side of said hub, each said compressor passage having an exit adjacent the peripheral tips of said blades, means to introduce fuel into the air flowing in said compressor passage upstream of said compressor passage exits, each said turbine passage having an inlet adjacent the peripheral tips of said blades interspaced therebetween, a chamber having a portion thereof peripherally about said blade tips for flows of gas into said rotor passages, said rotor upon rotation being adapted to induce a compressed flow of air through said compressor passage into said chamber with a peripheral component, means to ignite said fuel to induce a motive gas flow from said chamber into said turbine passages for flow radially inward thereof to said turbine exits to power said rotor into rotation about said axis, and said gas flow being discharged from said exits of said turbine passages.

9. In combination in a gas turbine, a rotor mounted for rotation about an axis, said rotor comprising a hub and a plurality of radial blades spaced peripherally about said hub, alternate adjacent pairs of said blades extending radially inward to opposite sides of said hub defining peripherally alternate compressor flow and turbine flow passages, and a heating chamber means having a portion thereof disposed annularly about said rotor, said compressor upon rotation discharging air into said chamber, and means to heat said air providing a motive gas discharging therefrom into said turbine passages radially inward thereof in streams peripherally alternated with said radially outward flows from said compressor passages.

10. In a gas turbine, the improved rotor structure comprising a hub adapted for rotation about an axis, said hub having a web extending generally radially relative to said axis, a plurality of generally radially directed blades fixed to said web and extending beyond the perimeter of said web and radially inward and to opposite sides thereof, said blades being spaced peripherally about said hub defining alternate compressor and turbine passages having a blade in common dividing each said compressor passage from the adjacent said turbine passage, each said compressor passage having an inlet on an axial obverse side of said hub and each said turbine passage having an exit on the reverse side of said hub, each said compressor passage having an exit adjacent the peripheral tips of said blades, and each said turbine passage having an inlet adjacent the peripheral tips of said blades interspaced therebetween.

References Cited by the Examiner
UNITED STATES PATENTS

| | | | |
|---|---|---|---|
| 2,390,506 | 12/1945 | Buchi. | |
| 2,694,291 | 11/1954 | Rosengart | 60—39.43 X |
| 3,269,120 | 8/1966 | Sabatiuk | 60—39.43 |

MARK NEWMAN, *Primary Examiner.*

R. D. BLAKESLEE, *Assistant Examiner.*